United States Patent
Zito

(10) Patent No.: US 10,638,819 B2
(45) Date of Patent: May 5, 2020

(54) USE OF GOLD POWDER ALLOYS FOR MANUFACTURING JEWELLERY ITEMS BY SELECTIVE LASER MELTING

(71) Applicant: PROGOLD S.P.A., Trissino (IT)

(72) Inventor: Damiano Zito, Trissino (IT)

( * ) Notice: Subject to any disclaimer, the term of this patent is extended or adjusted under 35 U.S.C. 154(b) by 408 days.

(21) Appl. No.: 15/308,810

(22) PCT Filed: May 18, 2015

(86) PCT No.: PCT/IB2015/053657
§ 371 (c)(1),
(2) Date: Nov. 3, 2016

(87) PCT Pub. No.: WO2015/173790
PCT Pub. Date: Nov. 19, 2015

(65) Prior Publication Data
US 2017/0164700 A1    Jun. 15, 2017

(30) Foreign Application Priority Data

May 16, 2014 (IT) ................................ VI2014A0128
May 16, 2014 (IT) ................................ VI2014A0129

(51) Int. Cl.
  *B22F 3/105* (2006.01)
  *A44C 27/00* (2006.01)
  (Continued)

(52) U.S. Cl.
  CPC .......... *A44C 27/003* (2013.01); *B22F 3/1055* (2013.01); *B23K 26/342* (2015.10); *B33Y 10/00* (2014.12); *B33Y 70/00* (2014.12); *C22C 1/0425* (2013.01); *C22C 1/0466* (2013.01); *C22C 5/02* (2013.01); *C22C 9/00* (2013.01); *C22C 30/02* (2013.01); *B23K 2103/08* (2018.08);
  (Continued)

(58) Field of Classification Search
  None
  See application file for complete search history.

(56) References Cited

U.S. PATENT DOCUMENTS

| 1,577,995 A | 3/1926 | Wise |
| 2,189,640 A | 2/1940 | Powell |

(Continued)

FOREIGN PATENT DOCUMENTS

| CH | 700273 A1 * | 7/2010 |
| JP | S59183995 A | 10/1994 |

(Continued)

OTHER PUBLICATIONS

English Translation of CH 700273 (published Jul. 2010) from Espacenet.*
Wikipedia page "Colored Gold", lat revised Feb. 3, 2019.*

*Primary Examiner* — George Wyszomierski
(74) *Attorney, Agent, or Firm* — Themis Law

(57) ABSTRACT

A method of manufacturing yellow, red or white gold jewelry items layer by layer by selective laser melting (SLM) of a 18K, 14K, 10K or 9K gold powder alloy. The alloy comprises: (A) 37.5% to 38.5% by weight or 41.7% to 42.5% by weight or 58.5% to 59.5% by weight or 75% to 76% by weight of gold; and (D) 0.01% to 5% by weight, preferably 0.01% to 3% by weight of at least one metalloid, which may be germanium, silicon, boron, tellurium, phosphorous and selenium.

20 Claims, 2 Drawing Sheets

(51) Int. Cl.
*C22C 5/02* (2006.01)
*C22C 9/00* (2006.01)
*C22C 1/04* (2006.01)
*C22C 30/02* (2006.01)
*B33Y 10/00* (2015.01)
*B33Y 70/00* (2020.01)
*B23K 26/342* (2014.01)
*B23K 103/08* (2006.01)
*B23K 103/12* (2006.01)
*B33Y 80/00* (2015.01)

(52) U.S. Cl.
CPC ........... *B23K 2103/12* (2018.08); *B33Y 80/00* (2014.12); *Y02P 10/295* (2015.11)

(56) References Cited

U.S. PATENT DOCUMENTS

| | | | |
|---|---|---|---|
| 5,340,529 A | | 8/1994 | DeWitt et al. |
| 6,383,248 B1 * | | 5/2002 | Taylor ................. B22F 5/10 419/28 |
| 2007/0037002 A1 * | | 2/2007 | Thorsson ............ B22F 1/0003 428/570 |
| 2013/0326878 A1 * | | 12/2013 | Boehm ............ A61C 13/0004 29/896.1 |
| 2014/0332507 A1 * | | 11/2014 | Fockele ............... B22F 3/1055 219/121.61 |

FOREIGN PATENT DOCUMENTS

JP          H083663 A    1/1996
WO    WO2005025783 A1    3/2005

* cited by examiner

_US 10,638,819 B2_

USE OF GOLD POWDER ALLOYS FOR MANUFACTURING JEWELLERY ITEMS BY SELECTIVE LASER MELTING

FIELD OF APPLICATION

The present invention is generally applicable to the technical field of the production of jewellery, and particularly relates to the use of yellow, white or red gold powder alloys for manufacturing jewellery items by selective laser melting (SLM), both for the rapid prototyping and the direct production.

DEFINITIONS

In the present text, the expression "selective laser melting" or derivatives means a process for manufacturing objects layer by layer beginning from computerized 3D drawings by subsequent addition of layers of powder that are melted by a laser beam at high power. This process is for example described in U.S. Pat. No. 6,215,093.

In the present text, the expression "fineness" or derivatives of a gold alloy or jewellery item means, unless otherwise indicated, the minimum concentration of gold in the alloy or the jewellery item. Typically, the gold fineness is expressed in thousandths of mass upon mass or carats. The fineness of an alloy or of a jewellery item is regulated by national and/or supranational legal standards.

For Europe, the reference standard for the finenesses of precious metal alloys is DIN EN 29202.

In the present text, the expression "carat" or derivatives related to the fineness of an alloy or of a jewellery item means, unless otherwise indicated, the twenty-fourth part of the total mass of an alloy or of a gold jewellery item. Therefore, for example, a 18K alloy or gold jewellery item contains minimum 75% of gold. The symbol of the carat is a K postponed to the number indicating the alloy fineness (18K for 18 carats, 14K for 14 carats, 10K for 10 carats, 9K for 9 carats).

In the present text, the expression "consists" or derivatives related to a composition or a concerned product that consists of two or more components means, unless otherwise indicated, that the product or composition totally consists of the listed components, that is the total of the listed components amount to 100% of the composition or of the product, unless the usual impurities generally present in that product or composition.

In the present text, the expression "jewellery item" or derivatives means, unless otherwise indicated, a finished product, of whatever shape and size, that derives from the manufacturing of an alloy with a predetermined fineness.

In the present text, the expression "weight percentages" or "% by weight" or derivatives means, unless otherwise indicated, the weight percentage of a concerned component with respect to the total weight of the composition in which the same component is included.

BACKGROUND OF THE INVENTION

The so-called SLM process provides for the selective laser melting of metal powder to build layer by layer the intended item.

Each section of the item is built by means of consecutive scan of the laser beam, which determines the linear melting of the metal powder, with the consequent progressive formation of a compact layer of alloy.

One of the main problems of this manufacturing process is the reflection of the electromagnetic radiation, which causes a poor absorption of energy and a reduced capacity of melting of the metallic particles.

This drawback is particularly felt in the jewellery art, due to the high reflectivity of precious alloys, particularly the gold alloys, a material that has an electric resistivity considerably higher than silver.

To avoid this drawback, additional surface treatments (oxidation, paint, etc.) are performed, leading to the formation of thin layers having an absorption higher than that of the substrate, which is then heated in an indirect way.

Furthermore, the high reflectivity of precious alloys involves the formation of high surface roughness, constituted of the projection of particles of metal powder above the layer of construction, the particles being also responsible of the formation of undesired surface bulges and porosities.

From the international application WO2005/025783 a powder mixture is known susceptible for manufacturing jewellery items by SLS. This mixture is composed of a basic material and a flux material that are sintered together.

It is clear that since the starting material is strongly inhomogeneous, the jewellery item thus manufactured has very strong irregularities in its chemical-physical structure.

Furthermore, this document suggests the use of a single powder consisting of particles having a completely fusible surface layer and an only partially fusible core.

SUMMARY OF THE INVENTION

The present invention relates to yellow, red or white gold powder alloys for manufacturing jewellery items by selective laser melting (SLM).

Jewellery items manufactured by the gold alloys according to the invention have high ductility, that is they are little fragile, a reduced surface roughness and a very low inner porosity, features particularly valued in the jewellery art.

As described hereinafter, the jewellery items manufactured by the alloy of the present invention may advantageously have a total roughness Rt lower than 65 μm and an inner porosity by volume lower than 2%, preferably lower than 1% and even more preferably lower than 0.5%.

In a per se known way, during the SLM process a layer of the powder alloy is superimposed to those already worked and it is melted by a laser beam of appropriate power.

In this process the part of the powder hit by the laser beam melts completely and homogeneously. In this above-mentioned feature the SLM process differs significantly with respect to the SLS process, wherein it is the fluxing powder which melts and sinters the basic powder, which does not melt or melts only partially. The SLS process is described, for example, in U.S. Pat. No. 5,156,697.

Another important aspect which make different the SLM technique with respect to the SLS technique is the fact that in the latter the laser has the function of sintering and not of melting the powder.

Suitably, the laser power may be selected so that the part of the powder concerned by the beam melts completely and homogeneously throughout the height of the layer.

As described hereinafter, to have a good quality of the jewellery items manufactured with the alloy of the present invention the laser power may be of at least 70 Watt.

The alloy of the present invention may be a unique and homogeneous powder, not a biphasic powder as in the SLS technique.

More particularly, the powder alloy of the present invention may consist of a plurality of particles, each one having the same composition.

Preferably, such powder may have a particle size of 1 µm to 60 µm.

The alloy of the present invention may be a 18, 14, 10 or 9 carats yellow, red or white gold alloy.

In general, each one of the particles that constitutes the powder alloy may comprise:

(A) 37.5% to 38.5% by weight (9 carats); or
41.7% to 42.5% by weight (10 carats); or
58.5% to 59.5% by weight (14 carats); or
75% to 76% by weight (18 carats) of gold; and
(D) 0.01% to 3% by weight of at least one metalloid selected from the group consisting of germanium, silicon, boron, tellurium, phosphorus and selenium, preferably, selected from the group constituted by germanium, silicon and boron.

The addition of metalloids in the powder has a fundamental role in the improvement of the selective laser melting (SLM) and their effect may be appreciated both in terms of lower surface roughness and porosity, and in terms of reduced projection of metal particles during the laser action.

In fact, the classic gold alloys while allowing to obtain jewellery items with good mechanical properties do not allow to have a good surface roughness and/or inner porosity.

The same occurs with the SLS technique, wherein the inner porosity is generally of 8-10%.

It is intended that the above-mentioned element (D) may consist of two or more of the above-mentioned metalloids, the range 0.01% to 3% by weight with respect to the total weight of the alloy being the same.

Since the metalloid negatively affects the ductility of the alloy, the amount of this element is relatively low. The amount of metalloids in the alloy increases while reducing the percentage of gold therein.

In addition to the above elements (A) and (D), the alloy of the present invention may consist of other two elements (B) and (C), apart the usual impurities. It is understood that apart the latter impurities, the alloy of the present invention may exclusively consist of the elements (A), (B), (C) and (D), that is the sum of the latter amounts to 100% of the alloy.

The elements (B) and (C) may be different whether the alloy is a yellow or a red gold alloy or a white gold alloy.

In particular, in the case of a yellow or red gold alloy, the powder alloy of the present invention may consist, apart the usual impurities, of:

(A) 37.5% to 38.5% or 41.7% to 42.5% or 58.5% to 59.5% by weight or 75% to 76% by weight of gold;
(B) 10% to 55% by weight of copper;
(C) 2% to 15% by weight of silver;
(D) 0.01% to 3% by weight of the at least one metalloid selected from the above-mentioned group.

Furthermore, since palladium has low thermal conductivity, the yellow or red gold alloys of the present invention may be free of this element.

Advantageously, a 18K yellow or red gold powder alloy may consist, apart the usual impurities, of:

(A) gold 75% to 76% by weight;
(B) copper 10% to 23% by weight;
(C) silver 2% to 15% by weight;
(D) at least one metalloid selected as described above 0.01% to 1% by weight and preferably 0.01% to 0.5% by weight.

More in particular, a 18K yellow or red gold powder alloy may consist, apart the usual impurities, of:

(A) gold 75% to 76% by weight;
(B) copper 10% to 14% by weight;
(C) silver 10% to 14% by weight;
(D) at least one metalloid selected as described above 0.01% to 1% by weight and preferably 0.01% to 0.5% by weight.

On the other hand, a 18K red gold powder alloy may consist, apart the usual impurities, of:

(A) gold 75% to 76% by weight;
(B) copper 18% to 23% by weight;
(C) silver 2% to 5% by weight;
(D) at least one metalloid selected as described above 0.01% to 1% by weight and preferably 0.01% to 0.5% by weight.

Suitably, a 14K red gold powder alloy may consist, apart the usual impurities, of:

(A) gold 58.5% to 59.5% by weight;
(B) copper 30% to 40% by weight;
(C) silver 5% to 10% by weight;
(D) at least one metalloid selected as described above 0.01% to 1.5% by weight and preferably 0.01% to 1% by weight.

In a preferred but not exclusive embodiment, a 10K red gold powder alloy may consist, apart the usual impurities, of:

(A) gold 41.7% to 42.5% by weight;
(B) copper 45% to 50% by weight;
(C) silver 8% to 13% by weight;
(D) at least one metalloid selected as described above 0.01% to 2% by weight.

Advantageously, a 9K red gold powder alloy may consist, apart the usual impurities, of:

(A) gold 37.5% to 38.5% by weight;
(B) copper 47% to 55% by weight;
(C) silver 8% to 15% by weight;
(D) at least one metalloid selected as described above 0.01% to 2% by weight.

As far as the white gold alloy of the present invention are concerned, two pairs of elements (B) and (C) may be provided, being alternative each other.

A first white gold powder alloy in accordance with the present invention may consist, apart the usual impurities, of:

(A) 37.5% to 38.5% or 41.7% to 42.5% or 58.5% to 59.5% by weight or 75% to 76% by weight of gold;
(B) 10% to 50% by weight of palladium;
(C) 10% to 50% by weight of silver;
(D) 0.01% to 3% by weight of the at least one metalloid selected as above described.

In this case, palladium and silver are in a weight ratio of 0.75:1 to 1:0.75.

On the other hand, alternatively to this composition, a second white gold powder alloy may consist, apart the usual impurities, of:

(A) 37.5% to 38.5% or 41.7% to 42.5% or 58.5% to 59.5% by weight or 75% to 76% by weight of gold;
(B) 5% to 35% by weight of nickel;
(C) 15% to 50% by weight of copper;
(D) 0.01% to 3% by weight of the at least one metalloid selected as above described.

In this case, nickel and copper are in a weight ratio of 1:2 to 1:3.

Clearly, the white gold alloy of the present invention, unlike the yellow or red gold alloy, does not include silver and copper at the same time.

Advantageously, a 18K white gold powder alloy in accordance with the present invention may consist, apart the usual impurities, of:
(A) 75% to 76% by weight of gold;
(B) 10% to 15% by weight of palladium;
(C) 10% to 15% by weight of silver;
(D) 0.01% to 1% by weight, preferably 0.01% to 0.5% by weight of the at least one metalloid selected as above described.

On the other hand, a 18K white gold powder alloy in accordance with the present invention may consist, apart the usual impurities, of:
(A) 75% to 76% by weight of gold;
(B) 5% to 10% by weight of nickel;
(C) 15% to 20% by weight of copper;
(D) 0.01% to 1% by weight, preferably 0.01% to 0.5% by weight of the at least one metalloid selected as above described.

Suitably, a 14K white gold powder alloy in accordance with the present invention may consist, apart the usual impurities, of:
(A) 58.5% to 59.5% by weight of gold;
(B) 15% to 25% by weight of palladium;
(C) 15% to 25% by weight of silver;
(D) 0.01% to 1.5% by weight, preferably 0.01% to 1% by weight of the at least one metalloid selected as above described.

On the other hand, a 14K white gold powder alloy in accordance with the present invention may consist, apart the usual impurities, of:
(A) 58.5% to 59.5% by weight of gold;
(B) 8% to 20% by weight of nickel;
(C) 23% to 35% by weight of copper;
(D) 0.01% to 1.5% by weight, preferably 0.01% to 1% by weight of the at least one metalloid selected as above described.

In a preferred but not exclusive embodiment, a 10K white gold powder alloy in accordance with the present invention may consist, apart the usual impurities, of:
(A) 41.7% to 42.5% by weight of gold;
(B) 25% to 45% by weight of palladium;
(C) 25% to 45% by weight of silver;
(D) 0.01% to 2% by weight of the at least one metalloid selected as above described.

On the other hand, a 10K white gold powder alloy in accordance with the present invention may consist, apart the usual impurities, of:
(A) 41.7% to 42.5% by weight of gold;
(B) 12.5% to 35% by weight of nickel;
(C) 35% to 50% by weight of copper;
(D) 0.01% to 2% by weight of the at least one metalloid selected as above described.

The above mentioned elements have been carefully selected so as to achieve the intended properties.

Therefore, since gallium creates potential problems related to the formation of bulges, the powder alloys of the present invention, being either of white, yellow or red gold alloy, may be free of gallium.

Furthermore, since platinum and tin have low thermal conductivity, the powder alloys of the present invention, being either of white, yellow or red gold alloy, may be free of these elements.

The invention will be better understood thanks to the following example, that are provided as non limitative examples of the invention.

EXAMPLES

Example 1

Preparation of Yellow and Red Gold Powder

Various examples of powder alloys have been prepared, being different for colour and fineness of gold, in accordance with table 1 below.

|  | Ex 1-18 Kt R | Ex 2-18 Kt R | Ex 3-18 Kt Y | Ex 4-14 Kt R | Ex 5-10 Kt R | Ex 6-9 Kt R |
| --- | --- | --- | --- | --- | --- | --- |
| (A) Au | 75.2 | 75.2 | 75.2 | 58.7 | 41.9 | 37.7 |
| (B) Cu | 20.8 | 21.0 | 12.4 | 33.45 | 47.06 | 50.46 |
| (C) Ag | 3.6 | 3.6 | 12.0 | 7.45 | 10.64 | 11.44 |
| (D) Ge | 0.4 | 0.2 | 0.4 | 0.4 | 0.4 | 0.4 |

INDEX →
Ex: Example;
18-14-10-9
Kt: 18, 14, 10, 9
K gold alloy;
R: red gold alloy;
Y: yellow gold alloy.

The alloys of the examples 1-6 of table 1 have been prepared by a gas spray nozzle working in an environment completely protected with argon and atmospheric pressure.

Figure 1:
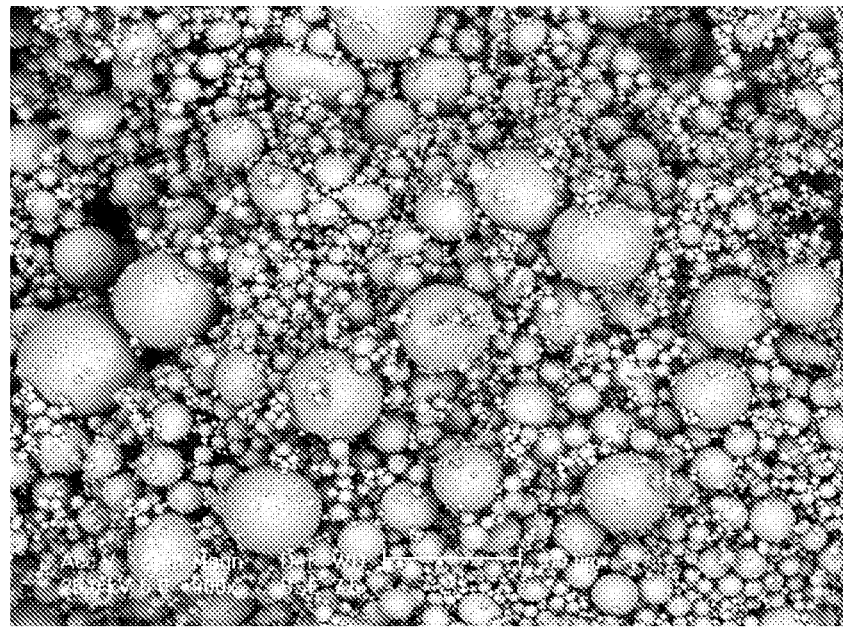
FIG. 1 shows a microscopic electronic scan (SEM, EDS) of the powder of example 1.

In FIG. 1 the microscopic electronic scan (SEM, EDS) of the powder of example 1, 18K red gold alloy (d.sub.50 15.44 µm, d.sub.90 35.90 µm) is shown. It is clear that the atomization ensures the formation of powders constituted of particles of mainly spherical shape.

Example 2

Manufacturing of Red Gold Jewellery Items by SLM

A lamellar block (parallelepiped having a length of 10.0 mm, width of 5.0 mm, thickness of 5.0 mm and a uniform nominal spacing between the individual leaves of 500 µm) has been manufactured in red gold by means of the powder of example 1.

A SLM 50 (Realizer) device has been used provided with a fiber laser (Wmax=100 Watt) having a spot starting from 10 µm and a circular construction table (70 mm), inserted in a chamber with atmosphere protected with inert gas (Ar). The scan speed of the laser has been of 0.33 m/s.

To evaluate the effect of the inclusion of the metalloids in the alloy, in addition to the above sample another sample without metalloids has been manufactured (same size and same device) with a 18K red gold alloy consisting of gold 75.2% by weight, copper 20.8% by weight and silver 4% by weight.

For both samples, the laser power has been set at 72.5 Watts.

Figure 2:
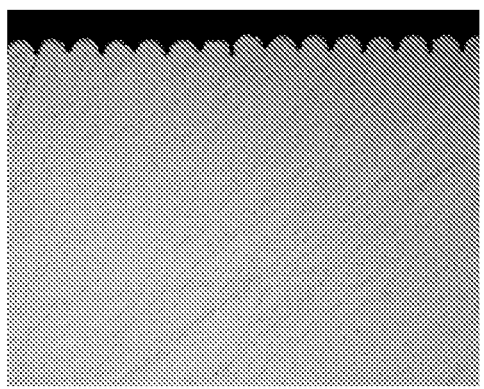
FIGS. 2 and 3 show views of a sample manufactured with the gold alloy with germanium of example 1.
Figure 3:
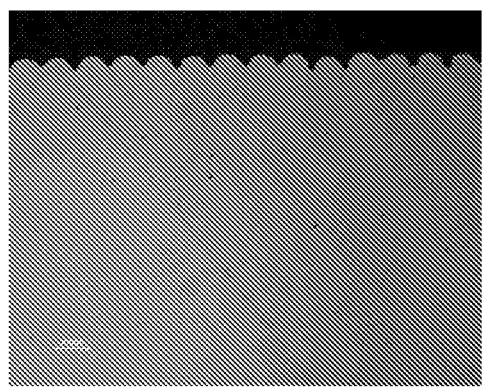

As it is visually understood from the comparison of FIGS. 2 and 3, the sample manufactured with the gold alloy with germanium of example 1 led to the formation of surfaces parallel to the table of construction, with a total roughness of about Rt=55 μm, that is to say about 30% less than the same alloy free of germanium, whose roughness was Rt=72 μm.

The roughness has been measured using a Taylor Hobson profilometer (Talysurf Intra2) provided with a carbon fiber probe with diamond tip having a radius of 2.0 μm.

Without being bound by theory, it is possible to state that alloys that after the SLM process provide jewellery items having a total roughness Rt greater than or equal to 66 μm are not part of the present invention.

Figure 4:
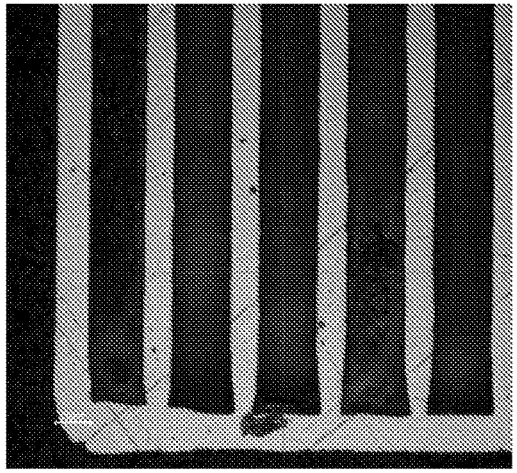
FIG. 4 shows a sample obtained with laser having a power of 62.5 W.
Figure 5:
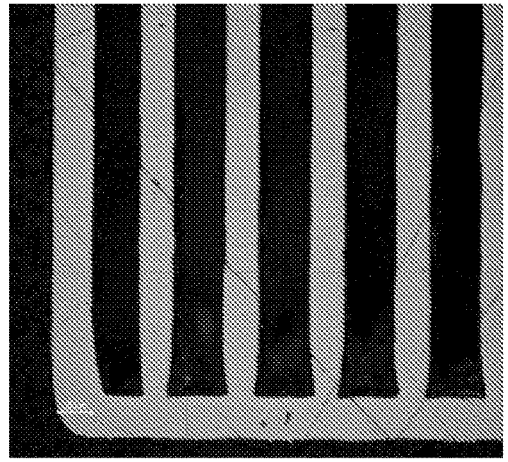
FIG. 5 shows a sample obtained with laser having a power of 72.5 W.
Figure 6:
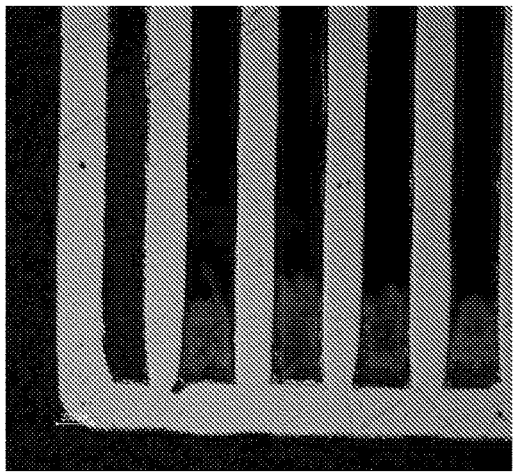
FIG. 6 shows a sample obtained with laser having a power of 82.5 W.
Figure 7:
FIG. 7 shows a sample obtained with laser having a power of 92.5 W.

To check the influence of the laser power the same above mentioned solids have been prepared with increasing laser power from 62.5 W to 92.5 W, the rest of the process parameters being equal for all samples. FIG. 4 relates to the sample obtained with laser having a power of 62.5 W, FIG. 5 relates to the sample obtained with laser having a power of 72.5 W, FIG. 6 relates to the sample obtained with laser having a power of 82.5 W, and FIG. 7 relates to the sample obtained with laser having a power of 92.5 W.

The reduction of the laser power causes a thinning of the carriers, since both the volume of the melting material and the time of solidification beginning from the melting state are reduced.

Therefore, to obtain jewellery items having suitable mechanical features it is preferable to set the laser power at least at 70 W. However, with the increase of the scan speed the above mentioned phenomenon is emphasized, so it is preferable to increase the laser power gradually.

To check the porosity of the jewellery items manufactured with alloys according to the invention through the alloy of example 1 it has been manufactured a massive solid of parallelepiped shape (10 mm×4.5 mm×3 mm) with the same above mentioned process parameters. The inner porosity has been evaluated upon the metallographic sections by means of the ImageJ 1.48B software.

The measurement of porosity has been carried out after the removal of 0.20 mm from the initial thickness of 3 mm. At the thickness of 2.80 mm measurements of the inner porosity have been made in several points. The porosity has always been lower than 1%, and often lower than 0.5%.

These values are indicative of high quality of the jewellery item.

Without being bound by theory, it is possible to state that alloys that after the SLM process provide jewellery items having inner porosity greater than 2% are not part of the present invention.

To evaluate the influence of the presence of the metalloid in the gold alloy regarding the ductility various alloy samples have been prepared of example 1 as mentioned above having an increasing percentage of germanium 0.2% to 2% (Au 75.2%, Ag 3.6%, Cu balance). The values of germanium have been 0.2%, 0.4%, 1%, 1.5%, 2% by weight.

The evaluation of the ductility has been done manually, as often occurs in jewellery. In fact, a jewellery maker often manipulates the jewellery item to work it or set stones.

Samples with germanium 1.5% and 2% by weight break if manipulated, and therefore are unacceptably fragile.

The best results have been shown by the samples with germanium 0.2% and 0.4% by weight.

Example 3

Preparation of White Gold Alloys

Two examples of white gold powder alloys have been prepared, both of 18K fineness.

Sample 1

Gold 72.5% by weight;
Palladium 12.4% by weight;
Silver 12.2% by weight;
Germanium 0.2% by weight.

Sample 2

Gold 72.5% by weight;
Nickel 7.5% by weight;
Copper 17.1% by weight;
Germanium 0.2% by weight.

The alloys of samples 1 and 2 have been prepared by a gas spray nozzle operating in a environment completely protected with argon and atmospheric pressure. The atomization ensures the formation of powders consisting of particles of mainly spherical shape.

Example 4

Manufacturing of Jewellery Items by SLM

Lamellar blocks (parallelepiped having a length of 10.0 mm, width of 5.0 mm, thickness of 5.0 mm and a uniform nominal spacing between the individual leaves of 500 μm) have been manufactured in white gold by means of the powders of samples 1 and 2.

A SLM 50 (Realizer) device has been used provided with a fiber laser (Wmax=100 Watt) having a spot starting from 10 μm and a circular construction table (70 mm), inserted in a chamber protected with atmosphere with inert gas (Ar). The scan speed of the laser has been of 0.33 m/s.

Both blocks have good mechanical properties and reduced surface roughness, as already verified for the red gold alloys (example 2).

The invention claimed is:

1. A method of manufacturing jewelry items layer by layer by selective laser melting (SLM) comprising:
   providing a 18K, 14K, 10K or 9K yellow, red or white gold powder alloy; and
   producing a jewelry item by melting the gold powder alloy into a plurality of adjoining layers with at least one laser beam,
   wherein the at least one laser beam causes the gold powder in each layer to melt completely and produce homogeneous layers,
   wherein the gold powder alloy consisting of a plurality of particles, each particle having a composition of:
   (A) 37.5% to 38.5% by weight, 41.7% to 42.5% by weight, 58.5% to 59.5% by weight, or 75% to 76% by weight of gold (Au);
   (B) X % to Y % by weight of a first element;
   (C) X' % to Y' % by weight of a second element;
   (D) 0.01% to 3% by weight of at least one metalloid;
   and possible impurities;
   wherein weight percentages are percentages by weight with respect to a total weight of the gold powder alloy;
   wherein the at least one metalloid is selected from the group consisting of: germanium (Ge), silicon (Si), boron (B), tellurium (Te), phosphorus (P), selenium (Se) or a mixture of two or more thereof;
wherein the gold powder alloy is free of gallium (Ga), platinum (Pt), and tin (Sn); and
wherein the gold powder allow further has a composition in which:
if the alloy is a yellow or red gold alloy:
(B) X is 10, Y is 55, and the first element is copper (Cu),
(C) X' is 2, Y' is 15, and the second element is silver (Ag),
and the yellow or red gold alloy is free of palladium (Pd);
if the alloy is a white gold alloy:
(B) X is 10, Y is 50, and the first element is palladium (Pd),
(C) X' is 10, Y' is 50, and the second element is silver (Ag),
wherein the palladium (Pd) and the silver (Ag) are in a weight ratio of 0.75:1 to 1:0.75, or
(B) X is 5, Y is 35, and the first element is nickel (Ni),
(C) X' is 15, Y' is 50, and the second element is copper (Cu),
wherein the nickel (Ni) and the copper (Cu) are in a weight ratio of 1:2 to 1:3.

2. The method of claim 1, wherein the gold powder alloy has a particle size of 1 μm to 60 μm.

3. The method of claim 1, wherein laser power is selected to melt completely and homogenously the gold powder hit by the at least one laser beam throughout a total height of a layer.

4. The method of claim 3, wherein the laser power is at least 70 Watt.

5. The method of claim 1, wherein the jewelry items have a total roughness Rt that is less than 65 μm.

6. The method of claim 1, wherein the jewelry items have an inner porosity in volume lower than 2%.

7. The method of claim 1, wherein the at least one metalloid is selected from the group consisting of: germanium, silicon or boron, or a mixture of two or more thereof.

8. The method of claim 1, wherein providing the gold powder alloy comprises providing a gold powder alloy produced by atomization.

9. The method of claim 1, wherein the gold powder alloy is a 18K yellow or red gold alloy, and wherein:
(A) the gold is 75% to 76% by weight,
(B) the copper is 10% to 23% by weight,
(C) the silver is 2% to 15% by weight, and
(D) the at least one metalloid is 0.01% to 1% by weight.

10. The method of claim 1, wherein the gold is yellow gold, and wherein:
(B) the copper is 10% to 14% by weight, and
(C) the silver is 10% to 14% by weight.

11. The method of claim 1, wherein the gold is red gold, and wherein:
(B) the copper is 18% to 23% by weight, and
(C) the silver is 2% to 5% by weight.

12. The method of claim 1, wherein the gold powder alloy is a 14K red gold alloy, and wherein:
(A) the gold is 58.5% to 59.5% by weight,
(B) the copper is 30% to 40% by weight,
(C) the silver is 5% to 10% by weight, and
(D) the at least one metalloid is 0.01% to 1.5% by weight.

13. The method of claim 1, wherein the gold powder alloy is a 10K red gold alloy, and wherein:
(A) the gold is 41.7% to 42.5% by weight,
(B) the copper is 45% to 50% by weight,
(C) the silver is 8% to 13% by weight, and
(D) the at least one metalloid is 0.01% to 2% by weight.

14. The method of claim 1, wherein the gold powder alloy is a 9K red gold alloy, and wherein:
(A) the gold is 37.5% to 38.5% by weight,
(B) the copper is 47% to 55% by weight,
(C) the silver is 8% to 15% by weight, and
(D) the at least one metalloid is 0.01% to 3% by weight.

15. The method of claim 1, wherein the gold powder alloy is a 18K white gold alloy, and wherein:
(A) the gold is 75% to 76% by weight,
(B) the palladium is 10% to 15% by weight,
(C) the silver is 10% to 15% by weight, and
(D) the at least one metalloid is 0.01% to 1% by weight.

16. The method of claim 1, wherein the gold powder alloy is a 18K white gold alloy, and wherein:
(A) the gold is 75% to 76% by weight,
(B) the nickel is 5% to 10% by weight,
(C) the copper is 15% to 20% by weight, and
(D) the at least one metalloid is 0.01% to 1% by weight.

17. The method of claim 1, wherein the gold powder alloy is a 14K white gold alloy, and wherein:
(A) the gold is 58.5% to 59.5% by weight,
(B) the palladium is 15% to 25% by weight,
(C) the silver is 15% to 25% by weight, and
(D) the at least one metalloid is 0.01% to 1.5% by weight.

18. The method of claim 1, wherein the gold powder alloy is a 14K white gold alloy, and wherein:
(A) the gold is 58.5% to 59.5% by weight,
(B) the nickel is 8% to 20% by weight,
(C) the copper is 23% to 35% by weight, and
(D) the at least one metalloid is 0.01% to 1.5% by weight.

19. The method of claim 1, wherein the gold powder alloy is a 10K white gold alloy, and wherein:
(A) the gold is 41.7% to 42.5% by weight,
(B) the palladium is 25% to 45% by weight,
(C) the silver is 25% to 45% by weight, and
(D) the at least one metalloid is 0.01% to 2% by weight.

20. The method of claim 1, wherein the gold powder alloy is a 10K white gold alloy, and wherein:
(A) the gold is 41.7% to 42.5% by weight,
(B) the nickel is 12.5% to 35% by weight,
(C) the copper is 35% to 50% by weight, and
(D) the at least one metalloid is 0.01% to 2% by weight.

* * * * *